United States Patent [19]

Sako et al.

[11] Patent Number: 4,975,915
[45] Date of Patent: * Dec. 4, 1990

[54] DATA TRANSMISSION AND RECEPTION APPARATUS AND METHOD

[75] Inventors: Yoichiro Sako, Chiba; Kentaro Odaka, Tokyo, both of Japan

[73] Assignee: Sony Corporation, Tokyo, Japan

[*] Notice: The portion of the term of this patent subsequent to Nov. 20, 2007 has been disclaimed.

[21] Appl. No.: 337,617

[22] Filed: Apr. 13, 1989

[30] Foreign Application Priority Data

Apr. 19, 1987 [JP] Japan .................................. 63-096547

[51] Int. Cl.$^5$ ............................................. G06F 11/10
[52] U.S. Cl. .................................. 371/37.4; 371/37.1; 371/37.7; 371/40.1; 371/41
[58] Field of Search ..................... 371/37.4, 37.5, 37.6, 371/37.7, 38.1, 39.1, 40.1, 40.3, 41, 37.1, 2.1, 2.2, 50.1; 360/48, 53

[56] References Cited

U.S. PATENT DOCUMENTS 4,320,511 3/1982 Koga .................................. 371/37.1
4,500,926 2/1985 Yoshimaru ..................... 371/37.1 X

*Primary Examiner*—Jerry Smith
*Assistant Examiner*—Robert W. Beausoliel
*Attorney, Agent, or Firm*—Philip M. Shaw, Jr.

[57] ABSTRACT

A data transmission and reception apparatus and method capable of selecting either of two modes having the same sampling frequency in which the bit numbers of one data unit are either m or n (which are integral numbers and m>n), while using the same error correction encoder and decoder for the two modes, by inserting m-n bits of dummy data bits into the n-bit data so as to handle it as m-bit data during the processes of error correction encoding and decoding.

38 Claims, 11 Drawing Sheets

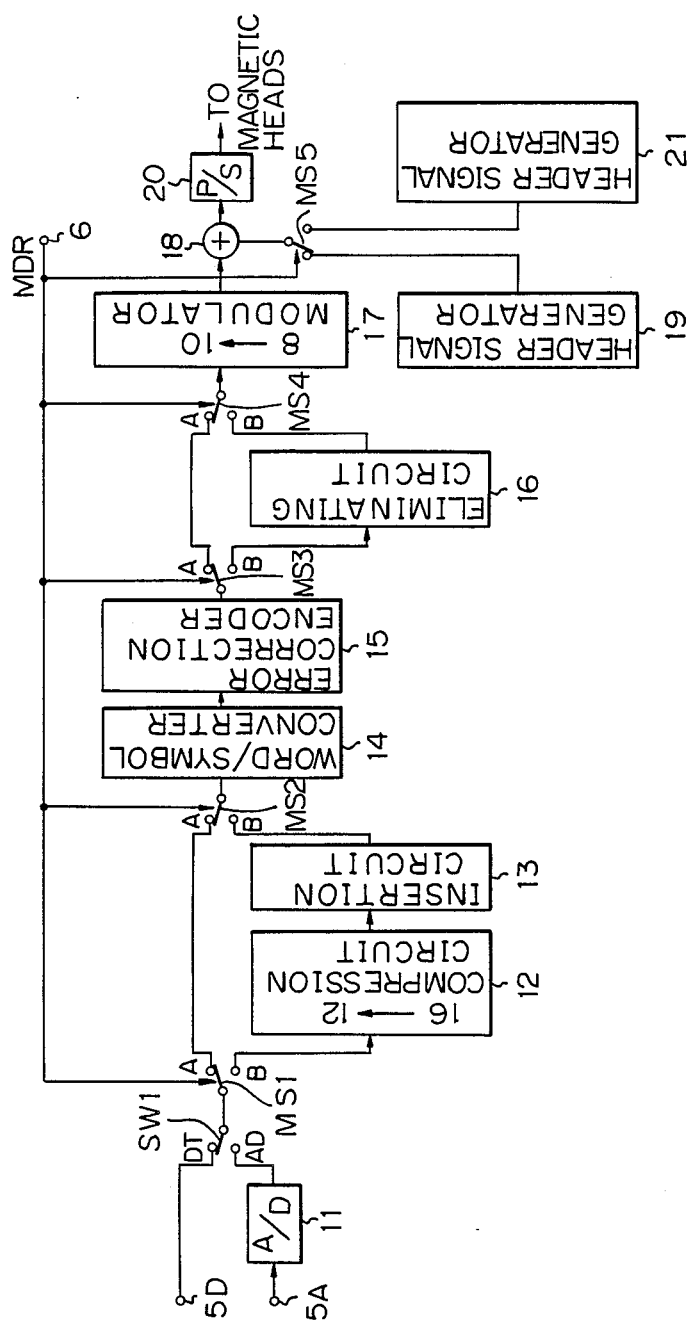

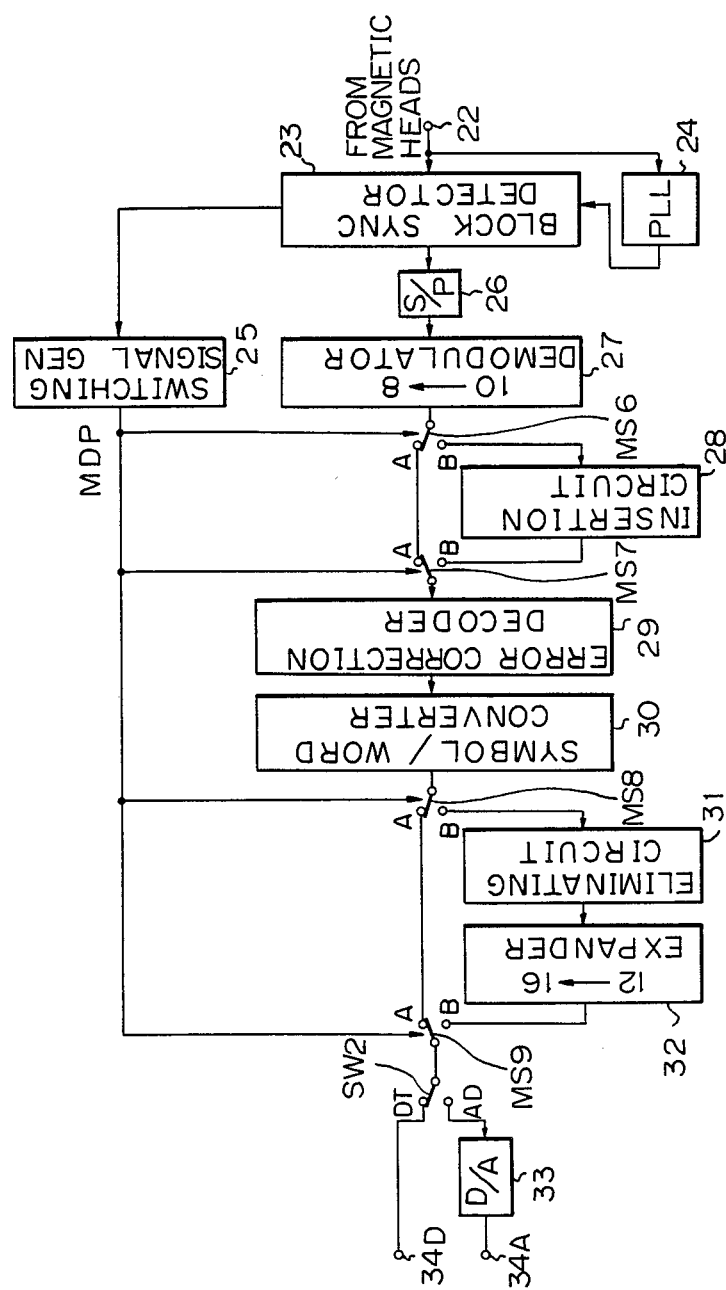

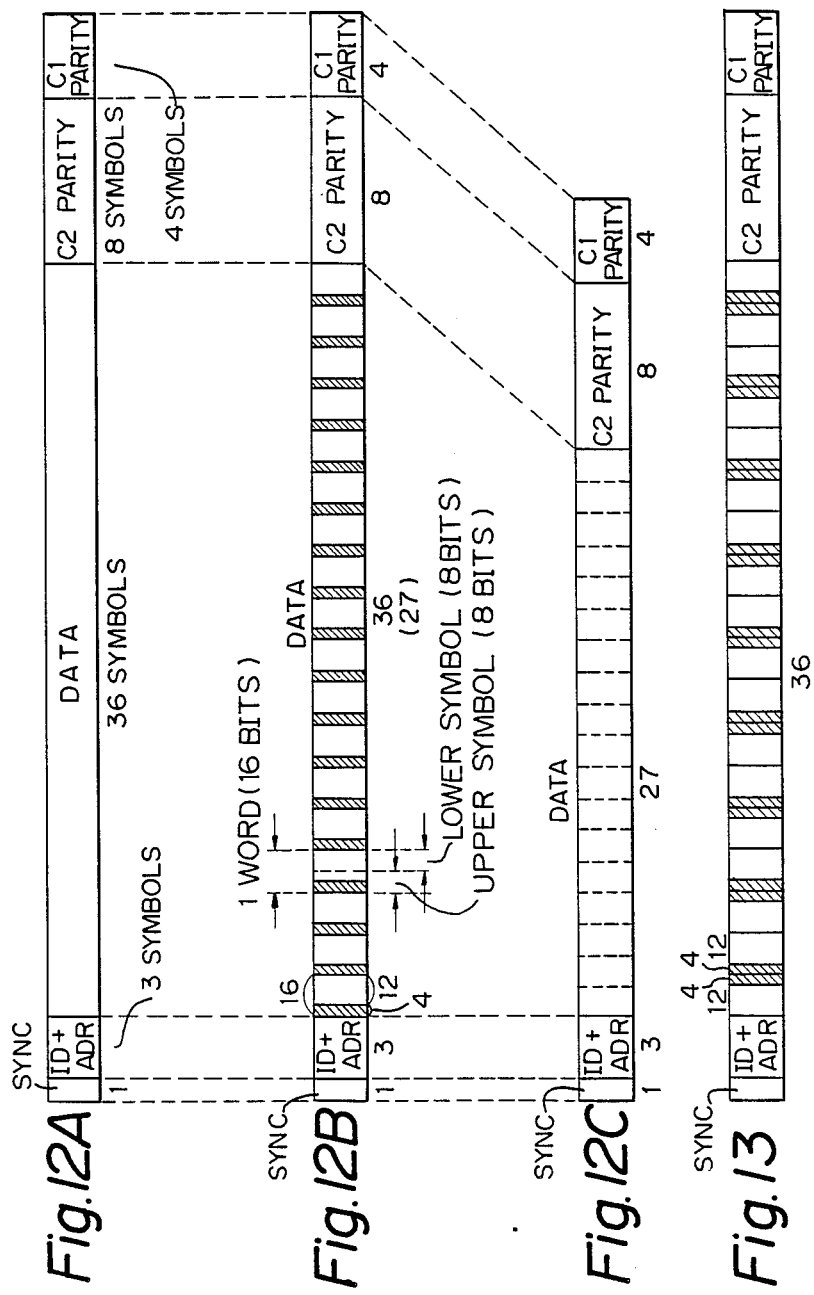

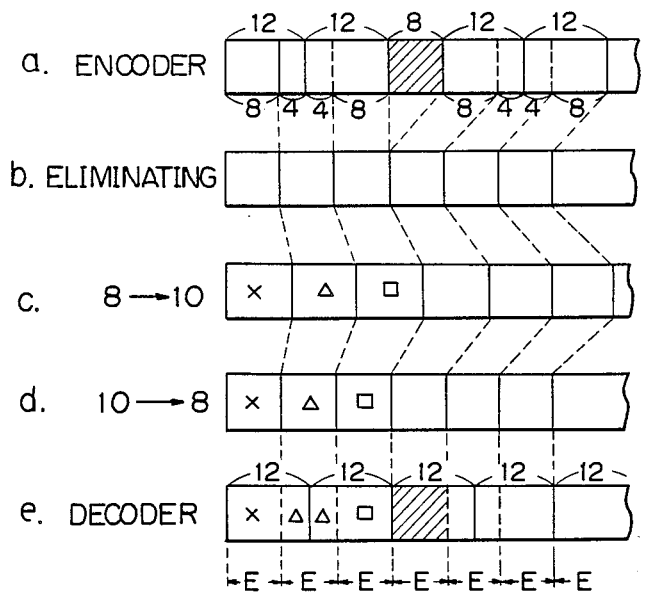

DATA TRANSMISSION AND RECEPTION APPARATUS AND METHOD

BACKGROUND OF THE INVENTION

1. Field of The Invention

The invention relates to a data transmission and reception apparatus and method for selecting two modes in which the bit numbers of one word are different but the sampling frequencies are the same.

2. Description of The Prior Art

In the case of an 8-mm VTR, an audio signal is recorded by mixing it with a color video signal in such a manner that the audio signal can be separated in terms of frequency using frequency modulation, and as an option, the audio signal can be subjected to pulse code modulation (PCM) and separated, in terms of area, from the color signal, and the recording can be made on one track formed by both signals.

FIG. 1 shows one example of a rotary head device of an 8-mm VTR, and FIG. 2 shows its tape format.

In FIG. 1, HA, HB are rotary magnetic heads for recording and reproducing, and these heads HA, HB are made so that the azimuth angles of the head gaps are different from each other, mounted at angles of 180° with respect to each other, and rotated in the direction of the arrow 3H at a frequency (30 kHz) in which they slightly project from the circumference of a drum 1. A magnetic tape 2 is attached over an angular range of 221° with respect to the circumference of the drum 1 and run at a constant speed in the direction indicated by the arrow 3T.

Therefore, tracks 4A and 4B having a length corresponding to 221° are formed alternately on the tape 2 by the rotary heads HA and HB as shown in FIG. 2 and a signal is recorded. In an area AP corresponding to an angle range of about 36° from the time when the rotary heads HA and HB of the tracks 4A and 4B (which contain a margin for after-recording a PCM audio signal and a guard band for distinguishing between area AP and area AV) start their scanning, a PCM audio signal associated with one field of a video signal is recorded in the time-compressed state. In a subsequent area AV corresponding to an angle range of 180°, a color video signal of one field, an FM audio signal and a signal for tracking are recorded. The FM audio signal is mixed in a lower frequency band of the color video signal. The remaining 5° is left for an allowance period for the separation of the heads from the tape. FIG. 3 shows a track format for recording a PCM audio signal on areas AP2~AP6 respectively which are formed by dividing area AV (FIG. 2) by every 36° rotation of the magnetic heads HA and HB, thereby enabling recording of six audio channels in total on the areas AP1-~AP6.

The aforementioned recording system as shown in FIGS. 2 and 3 is described in detail in U.S. Pat. No. 4,542,419. The PCM audio signal in such an 8-mm VTR is made to have one word/8 bits and is slightly inferior in terms of performance as compared with CD (compact disc) or DAT (digital audio tape).

Recently the performance of magnetic tape as a recording medium has been improved, and without extending the PCM area AP of the existing angle range of 36°, audio data, each word of which is composed of 12 bits, can be recorded at a sampling frequency of 48 kHz with respect to a metal powder tape (MP tape) with metal powder bounded, and audio data, each word of which consists of 16 bits, can be recorded at the sampling frequency of 48 kHz with respect to a metal evaporated tape (ME tape).

Therefore, the bit number per word of the audio data can be increased. In this case, it is convenient for a user to be able to select between either of two kinds of modes for recording audio data to match the tape performance: one word/12 bits in the PCM area AP (MP mode) or one word/16 bits (ME mode).

However, in a system where the selection between the two kinds of modes is possible, separate processing systems for one word/12 bits of data and the one word/16 bits of data must be provided. This causes an impractical increase of hardware. For this reason, it is desired that the requirement for such increased hardware be reduced as much as possible.

Certain known DATs (Digital Audio Tape Recorders) are constructed so that they can assume a one word/16 bits mode and a one word/12 bits mode. The sampling frequency $f_s$ is 48 kHz with the one word/16 bits mode. However, with the one word/12 bits mode, the sampling frequency $f_s$ 32 kHz and the speed of the magnetic tape and the rotation number of the rotary head drum are reduced by ½ to enable long-hour recording. Specifically, although the bit period of the serial data is 13 μsec in the case of $f_s = 48$ kHz and one word/16 bits, the bit period of the serial data is 26 μsec in the case of $f_s = 32$ kHz, and one word/12 bits. If the speed of the magnetic tape and the drum speed are reduced by ½, the recording wavelength, i.e., the transmission bit rate per bit on the tape can be kept identical.

In the DAT, a hardware increase is prevented by using the error correction encoder, decoder, etc. in common in the two modes as follows.

FIG. 4 shows a code structure of a PCM audio signal and redundant data of the error correction code which are recorded on one segment formed at one scanning of the rotary head. Each column shows one block, and M blocks are arranged side-by-side in the horizontal direction. A PCM audio signal in one block is composed of N words, and NXM words of PCM audio signals are arranged in a two dimensional array. An error detection code C1 is added to each block in the longitudinal direction of the two dimensional array of the audio PCM signals, and an error correction code C2 is added in the horizontal direction. An n-word check code P of the error detection code C1 is contained in each block. Similarly an m-word check code Q of the error correction code C2 is added to each row of M blocks.

In this case, the sizes of the two dimensional planes on which the encoding of C1 and C2 is done are the same for a one word/16 bits mode and a one word/12 bits mode. Also, the length of one data block, which is one code sequence of the code C1, is selected to be the least common multiple L of 16 bits and 12 bits, which is multiplied by an integer, and the bit numbers per block are made equal in both modes. In the case of the one word/16 bits mode, the 16-bit word is composed of an upper eight-bit symbol and a lower eight-bit symbol to form an error correction code, and in the case of the one word/12 bits mode, as shown in FIG. 5, exactly the same error correction encoding process as in the case of the one word/16 bits is performed after reallocating its upper eight bits and lower four bits.

With the above-mentioned technique, the common use of the error correction encoder and the error correction decoder is achieved in both modes of one word/16 bits and one word/12 bits to prevent a hardware increase (refer to U.S. Pat. No. 4,688,225 and U.S. Pat. No. 4,758,907).

Therefore, it is possible in an 8-mm VTR to use a conversion table for 16 bits and 12 bits of DAT data when the recording and reproduction of audio data of both the ME mode (one word/16 bits) and the MP mode (one word/12 bits) are made in the PCM audio area AP corresponding to the ME tape or the MP tape.

However, in the case of the 8-mm VTR, the sampling frequency of the audio signal, transporting speed of the magnetic tape and rotational speed of the rotary heads are not changed with a change of the modes. The recording is made in the PCM audio area AP at an adequate recording wavelength per bit, depending on tape types (ME/MP), and the transmission bit rate is not the same in both modes as in a DAT. As a result, the sizes of the two dimensional planes of the PCM audio signal are different in both modes.

For example, FIGS. 6A and 6B show one example of a two dimensional plane construction of error correction blocks of a one word/16 bits mode and a one word/12 bits mode for NTSC adaptation, respectively. The planes are stored in a memory. Numerals indicated in the drawing show the byte number (one byte=8 bits=1 symbol), each column in the longitudinal direction is one block having (4+40+4=48 bytes=48 symbols=8 symbols+20 words), and this is maintained unchanged in both modes. Consequently, the circuit for adding the block synchronization signal or block address data can be made to have the same structure in both modes. In the drawing, a header composed of the block synchronization signal and block address data is indicated in the state where the header is added to each block. The detail of the construction of the block shown in FIG. 6A is described in the U.S. patent application Ser. No. 252,807 filed on Sept. 30, 1988 by the same assignee. Each block in the case of the one word/12 bits is handled as symbol data for every eight bits by a conversion table in a manner similar to the above-mentioned DAT.

In this way, if the length of each block in the longitudinal direction of the two dimensional array of PCM audio signals is selected to have a common value (48 bytes in the drawings) for the one word/16 bits mode and the one word/12 bits mode, the byte numbers in the horizontal direction become different since the word numbers (not bit numbers) contained in the two dimensional planes are the same in both modes. However, with the following method, it is possible to keep the construction of the error correction code unchanged.

Specifically, the number of symbols of audio data in the horizontal direction is 80 bytes in the 16-bit mode in this example, and its number is selected to be $12/16 = \frac{3}{4}$ of 80 bytes=60 bytes in the 12-bit mode.

In the 16-bit mode, as shown by the circles ○ in FIG. 36A, one sequence of the error correction code C2 in the horizontal direction is composed of symbols which lie every four bytes. Consequently one row in the horizontal direction has four sequences for the correction code C2. For example, one sequence of its code C2 is constructed by the (25, 20, 6) Reed-Solomon code having five-byte check code per one sequence. The terminology (25, 20, 6) means that there are 25 total symbols, 20 data, and the minimum length is 5 parity+1=6 bits. A check code Q of a total of 20 bytes for four sequences is added to the left-hand side of the PCM audio data per one row in the horizontal direction as shown in FIG. 6A.

In addition, in the 12-bit mode, as shown by circles ○ in FIG. 6B, one sequence of the error correction code C2 is composed of symbols which lie every three bytes. Consequently one row in the horizontal direction has three sequences for the error correction code C2. One sequence of the code C2 is constructed with the (25, 20, 6) Reed-Solomon code in a manner similar to the 16-bit mode, and a five-byte check code Q is developed per one sequence. A check code Q of a total of 15 bytes is added to the left-hand side of the audio PCM data as indicated in FIG. 6B.

In this case, the byte number of audio data corresponding to one field period to be recorded in the area AP on a tape becomes $$\frac{48000 \times 16 \times 2}{59.94 \times 8} = 3202.2 \ldots$$

when the sampling frequency is 48 kHz, one word is 16 bits, and two channels for the left-and right-hand sides are employed in the presence of an NTSC signal. As a result, 3204 bytes are needed. However, in the case of FIG. 6A, 40×80=3200 bytes are needed to provide a remainder of 4 bytes. The four-bytes of data can be dealt with by adequately inserting it into the header. The technique described in the aforementioned U.S. patent application Ser. No. 252,807 can be employed for inserting four symbols into the header.

The error correction code C1 in the longitudinal direction is the same with the two modes, and the (44, 40, 5) Reed-Solomon code, for example, is used.

In the above manner, the structures of the error correction codes in the two modes can be made identical and a circuit for adding the header containing a block synchronization signal and address data can be used in common.

However, as clear from FIGS. 6A and 6B, the block structure of the two dimensional array for error correction is varied with the one word/16 bits mode and the one word/12 bits mode. For this reason, two kinds of format processes are needed depending on each mode. This imposes an extreme burden on the hardware.

OBJECTS AND SUMMARY OF THE INVENTION

Accordingly, it is an object of this invention to provide a data transmission apparatus and a data reception apparatus that avoid the above-described difficulties encountered with previously known apparatus, and can reduce the burden imposed on hardware.

In accordance with an aspect of this invention, there is herein described data transmission apparatus capable of selecting a first mode in which one unit of data is made up of m bits and a second mode in which one unit of data is composed of n bits (m>n), where m and n are integral numbers, with the same sampling frequency, comprising:

(a) error correction encoding means commonly used for the first and second modes;

(b) insertion means for inserting m-n bits of dummy data into the units of data;

(c) elimination means for eliminating the inserted bits from the data; and (d) addition means for adding an information header, including at least a block synchronization signal, to the data, wherein in the first mode, data units composed of m bits each are encoded by the error correction encoding means, the addition means adds a first block synchronization signal to each block of the encoding-processed data, and data from the addition means is transmitted, and in the second mode, the insertion means inserts bits in each data unit composed of n bits so as to transform it into one unit of m-bit data which is supplied to the error correction encoding means where it is encoded, the elimination means eliminates the inserted bits from the error correction encoded data so as to output units of n bit data, these units of n bit data from the elimination means are supplied to the addition means which adds a second block synchronization signal to each block and the resulting data from the addition means is transmitted.

In a preferred embodiment of the invention the addition means for adding an information header also adds to the data a mode identification signal indicating whether the first mode is selected or the second mode is selected.

Described herein also is an apparatus for receiving transmission data transmitted from the above described data transmission apparatus, comprising:

(a) synchronization detection means for detecting the first and second block synchronization signals from the transmission data;

(b) switching signal generating means connected to the synchronization detection means for deciding whether the detected block synchronization signal is the first block synchronization signal or the second block synchronization signal and generating a corresponding mode switching signal;

(c) insertion means for inserting into the data units m-n bits of dummy data;

(d) error correction decoding means used commonly for the first and the second mode; and (e) elimination means for eliminating the inserted bits from the data;

wherein when the first mode is selected by the mode switching signal, the error correction decoding means error correction decodes the data from the synchronization detection means and the m-bit data unit data is decoded, and when the second mode is selected by the mode switching signal, the data from the synchronization detection means is supplied to the insertion means where the inserted bits are inserted into each unit of the n-bit data unit to make m-bit unit data, this data is supplied to the error correction decoding means and is decoding-processed, the decoding-processed data is fed to the elimination means where the inserted bits are eliminated so as to decode the n-bit data units.

The invention further includes the methods performed by the above-described apparatuses.

The above, and other, objects, features and advantages of the present invention will become readily apparent from the following detailed description thereof which is to be read in connection with the accompanying drawings.

BRIEF DESCRIPTION OF THE DRAWINGS

FIG. 7 is a block diagram of a data transmission apparatus according to one embodiment of the present invention;

FIG. 8 is a block diagram of a data reception apparatus according to one embodiment of the present invention;

FIGS. 12A to 12C and FIG. 13 are schematic diagrams of the transmission data; and FIGS. 14A to 14D are schematic diagrams for explaining the encoding and decoding processes.

DETAILED DESCRIPTION OF THE PREFERRED EMBODIMENT

Figure 1:
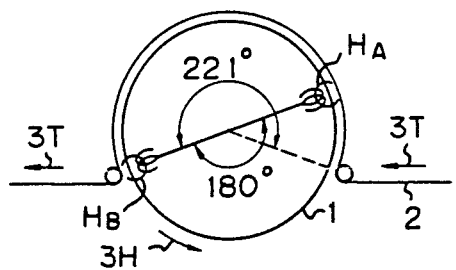
FIG. 1 is a schematic plan view of a known 8-mm VTR that can be used in the present invention.
Figure 2:
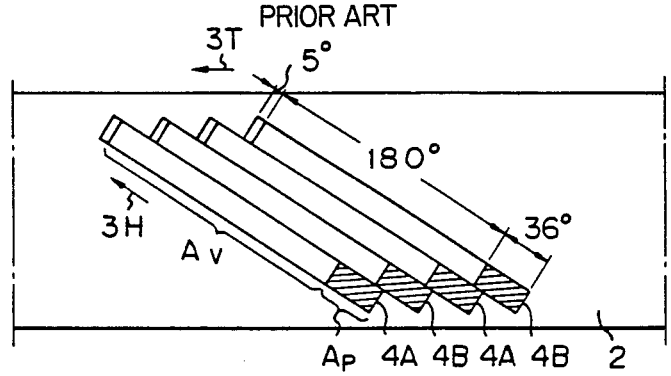
FIG. 2 and FIG. 3 are schematic plan views of sections of magnetic tape showing a known tape format.

FIG. 7 is one embodiment in which a data transmission apparatus according to the invention is applied to a recording system of PCM audio data of an 8-mm VTR.

In FIG. 7, MS1~MS5, inclusive, are mode switching circuits, each of which is switched on the side of a terminal A by a mode switching signal MDR from a terminal 6 in a one word/16 bits mode (hereunder called "A mode" or "ME mode") and on the side of a terminal B by the signal MDR in a one word/12 bits mode (hereunder called "B mode" or "MP mode"). The mode switching signal can be supplied in using a tape, for example, through the user's manipulation of a switching circuit. Alternatively, the metal powder tape and the metal evaporated tape can be automatically distinguished from each other by identification means such as a hole provided in the tape cassettes, and a mode switching signal can be automatically provided by the output of the identification means.

SW1 is a switch circuit which is to be understood as being capable of switching, either manually or automatically, between input digital or analog audio data.

The digital audio data derived from a CD, DAT or the like is supplied to a terminal DT of the switch circuit SW1 through an input terminal 5D. The digital audio data is two-channel data for the right-hand and left-hand sides and is parallel data, which consists of one word of sixteen bits with a sampling frequency of 48 kHz.

An analog audio signal derived from an FM tuner, TV, microphone or the like (the left-hand and right-hand two channels) is supplied to an A/D converter 11 through an input terminal 5A, sampled at the sampling frequency 48 kHz, converted into parallel data, each word of which has 16 bits, and supplied to a terminal AD of the switch circuit SW1.

First, a description will be supplied of the A mode. Word data of 16 bits from the switch circuit SWI is supplied to a word/symbol converter 14 through the switch circuits MS1 and MS2 and converted into a symbol composed of an upper eight bits and a lower eight bits. The symbol data is supplied to an error correction encoder 15 and subjected to an error correction encoding process on the Galois field (GF 28).

Figure 9A:
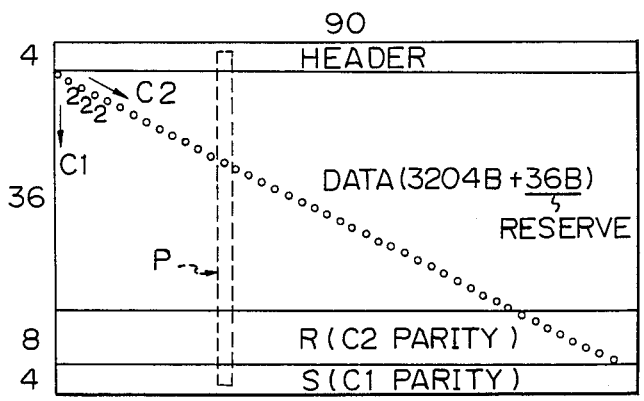
FIG. 9A and FIG. 9B are schematic diagrams of data arrangements of the first mode.
Figure 9B:
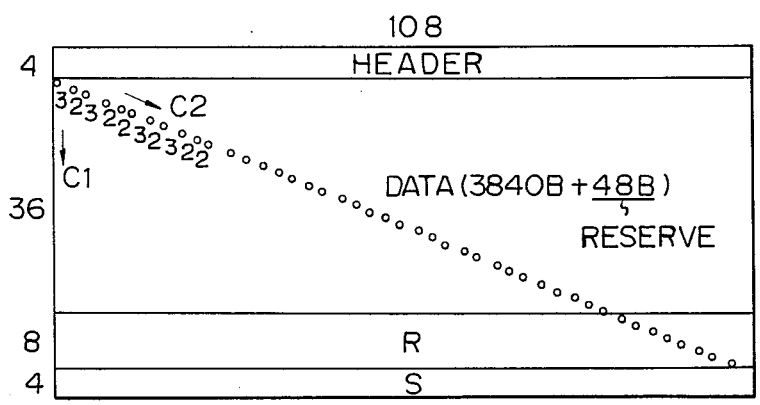

FIG. 9A and FIG. 9B show a two dimensional array of audio data of one field to be recorded in the PCM audio area AP in the A mode, and FIG. 9A is adaptable for the NTSC system and FIG. 9B is adaptable for the CCIR system.

In FIGS. 9A and 9B, each column in the longitudinal direction shows one block, 90 blocks are arranged in the horizontal direction for NTSC adaptation, and 108 blocks are arranged in the horizontal direction for CCIR adaptation. One block contains a 36-symbol PCM audio signal, and 3240-symbols (byte) (3204-byte data and 36 bytes for reserve) of PCM audio signals are arranged in NTSC, while 3888-symbols (3840-byte data and 48 bytes for reserve) of PCM audio signals are arranged in CCIR.

An error correction code C2, for instance, (44, 46, 9) Reed-Solomon code is performed in the diagonal direction of the two dimensional array of the PCM audio signals, and an 8-symbol check code R is developed and added to the lower side of the PCM audio signals. In the case of this example, the sequence of the error correction code C2 in the diagonal direction sequentially contains symbols at positions shifted by two symbols in the horizontal direction when shifted by one symbol in the longitudinal direction in the NTSC system. In the CCIR, when shifted one by one by one symbol in the longitudinal direction, the sequence contains symbols at positions shifted 3, 2, 3, 2, 2 symbols repeatedly one by one in the horizontal direction.

For every block in the longitudinal direction of the two dimensional array in which an 8-symbol check code R of the error correction code C2 is added to the two dimensional array of the PCM audio signals, an error detection or correction code C1, for example, the (48, 44, 5) Reed-Solomon code is applied to develop a four-symbol check code S to be added in the longitudinal direction.

A four-byte header composed of a one-byte block synchronization signal and 3 bytes, including a block address signal, is added to the start position of each block in the longitudinal direction. One block, for example block P, has a structure as shown at FIG. 12A. The information header is added by an adder 18 as mentioned later and is not added during the process of encoding. However, the header can alternatively be added during the process of encoding and the information of this header can be error-encoding-processed as data.

It is to be noted that the error correction code C2 can be made into two sequences consisting of symbols arranged every other symbol in the longitudinal direction and the remaining symbols arranged every other symbol so that the (22, 18, 5) Reed-Solomon code, for example, can be applied to the respective sequences. With this, the load imposed on the encoder 15 can be reduced.

Figure 11:
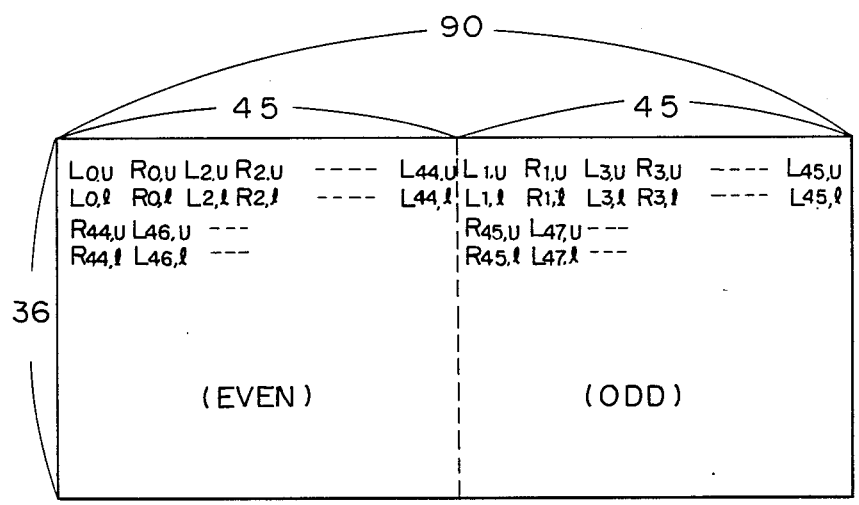
FIG. 11 is a schematic diagram of the detailed data arrangement with respect to the word number.

Additionally, in the case of this example, even numbered data L0u, L0l, L2u, L2l, ..., R0u, R0l, R2u, R2l, ... of audio data for the left-hand and right-hand sides and odd numbered data L1u, L1l, L3u, L3l, ..., R1u, R1l, R3u, R3l, ... are separately arranged for the half of the left-hand side and that of the right-hand side. In FIG. 11, suffixes u and l indicate the upper 8-bit symbol and the lower 8-bit symbol of the 16-bit word, respectively. As mentioned later, the even numbered data and the odd numbered data are recorded at separate positions since the data is sequentially recorded in the block direction (longitudinal direction). Consequently, even if either of the even numbered data or the odd numbered data disappears due to a burst error, error correction can be made easily by average interpolation using the remaining data.

Referring again to FIG. 7, the output of the error correction encoder 15 is fed to an 8-10 modulator 17 through the switch circuits MS3 and MS4, and 8-bit symbol data is converted into 10-bit data. The output of the 8-10 modulator 17 is supplied to an adder 18. The 8-10 modulator 17 is provided for preventing a bit-error caused by a DC component included in the recording data, and generates 10-bit data so as to reduce the DC component.

Further, a block synchronization signal SYNC with a period for 16-bit data and an address signal are supplied to the adder 18 through the switch circuit MS5 from a header signal generator 19 for 16-bit data and added to the data. Also, an identification signal for distinguishing the A mode from the B mode can be inserted as a header signal and added to the data.

The output of the adder 18 is supplied to a parallel-serial converter 20, converted into serial data sequentially from block data on the left-hand side in the longitudinal direction of the two dimensional array of FIGS. 9A and 9B, supplied to the rotary magnetic heads, and recorded on a tape.

Next an explanation will be supplied of the B mode. 16-bit data from the switch circuit MS1 is fed to a 16-12 compression circuit 12, and 12-bit data is provided from this circuit 12. At the compression circuit 12, for example, non-linear compression is performed. The 12-bit data from the compression circuit 12 is supplied to an insertion circuit 13. In the circuit 13, four bits of dummy data, that is four bits "0's" is added to each 12-bit data word to provide a 16-bit data word.

In this case, the inserted four bits are added to the upper-bit side of the 12-bit word as shown by the shaded columns in FIG. 12B. As a result, one upper symbol is made up of the upper four bits of the 12-bit word and the inserted four bits.

Figure 10:
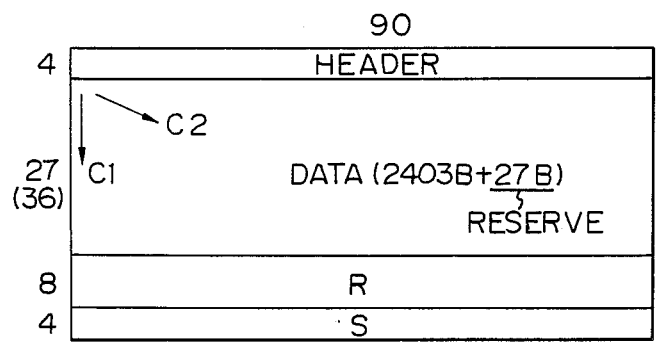
FIG. 10A and FIG. 10B are schematic diagrams of data arrangements of the second mode.
Figure 10:
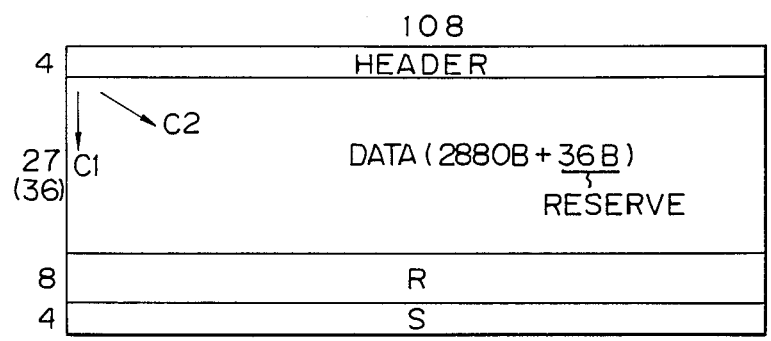

The 16-bit data from the insertion circuit 13 is supplied to the word/symbol converter 14 through the switch circuit MS2, converted into symbol data, and supplied to the error correction encoder 15 so that the error correction codes C1 and C2 are performed in quite a similar manner to the A mode. In this case, since the data with the inserted four bits added has the same two dimensional array as that in the A mode, as shown in FIG. 10, the data number contained in one block corresponds to 27 bytes in this B mode in terms of data except for the inserted bits (dummy data). In FIG. 10, byte number 27 in the longitudinal direction does not include the dummy data, and after inserting the dummy data, a two dimensional array having 36 bytes in the longitudinal direction is formed in a memory (not shown) of error correction encoder 15.

The two dimensional array data contains 2430 bytes (2403-bytes of data and 27 bytes for reserve) in NTSC as shown in FIG. 10A, and the array data includes 2916 bytes (2880-bytes of data and 36 bytes for reserve) in CCIR as shown in FIG. 10B. These reserve bytes are provided to identify the character of the PCM audio signal.

Data from the encoder 15 is supplied to an insertion-data eliminating circuit 16 through the switch MS3 for the elimination of the inserted bits. As a result, from the eliminating circuit 16, block data of 12 bits/one word (27-bytes of data and parities R, S) is obtained as shown in FIG. 12C, supplied to the 8–10 modulator 17 through the switch circuit MS4, converted into 10-bit data at every eight bits, and then supplied to the adder 18. In this B mode, a block synchronization signal, etc. is produced from a header signal generator 21 for 12 bits at the timing of each block of 12-bit data, supplied to the adder 18 through the switch circuit MS5 and added to the data. The output signal of the adder 18 is recorded with a video signal through a parallel-serial converter 20.

In the foregoing example, the inserted four bits are added to the upper bits of a 12-bit word. However, those inserted bits can be added to the lower bits of the 12-bit word.

In addition, as indicated by the shaded columns in FIG. 13, the inserted bits can be added so that they are added on the lower-bit side for odd numbered words (words having a block-in address of an odd number) and on the upper-bit side for even numbered words (words having a block-in address of an even number).

In this manner, when a conversion error for each symbol in 8–10 modulation is considered, the error can be extremely reduced at the process of the error correction encoding and decoding. Referring to FIG. 14, the explanation of this advantage is made as follows.

Figure 14A:
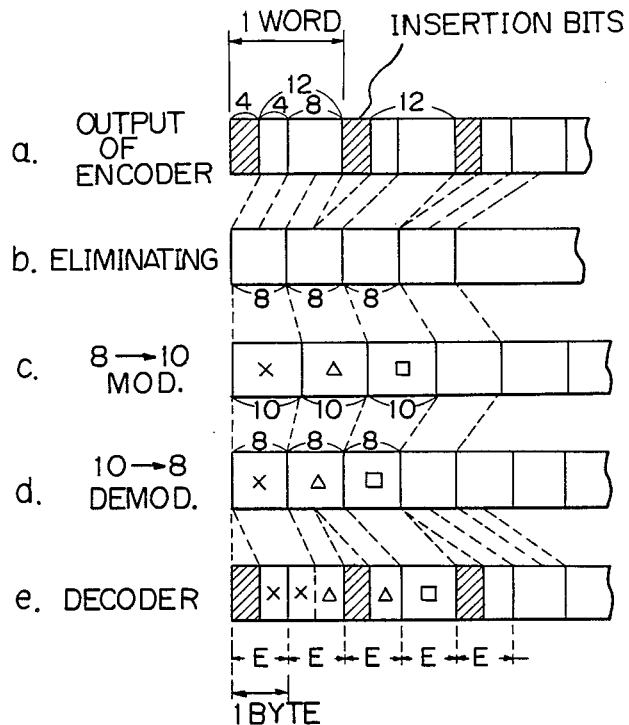
Figure 14B:
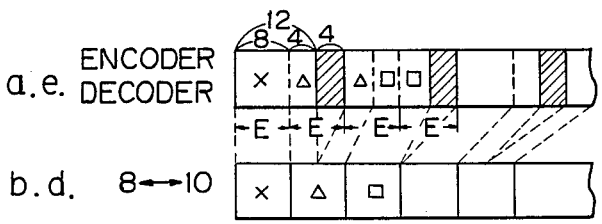

FIG. 14A-a shows the case of inserting the dummy data (the shaded portion) only into the upper bit side of one word (the upper side of the upper symbol). The data output of the eliminating circuit 16 is only the true eight bit data, as shown in FIG. 14A-b. The dummy data has been eliminated. This eight-bit data is converted to 10-bit data by the 8–10 modulator 17, and the output data of the 8–10 modulator 17 is recorded/reproduced magnetically (FIG. 14A-c).

Consider the case in which one-byte of error is included in the output of the 10–8 demodulator 27 (shown by mark X, Δ or □ in FIG. 14A-d) in the process of magnetic recording/reproducing. In this case, one-byte-errors shown by marks X and Δ in FIG. 14A-e become two-byte-errors respectively at the error correction decoder 29 after inserting the dummy data. The cycle of the error correcting operation of the encoder 29 is indicated by E in the drawings, for example the error bits marked X are shared among two operational cycles.

FIG. 14B shows the case of inserting the dummy data (the shaded portion) only into the lower bit side of one word (the lower side of the lower symbol), and a detailed description thereof will be omitted herein for the sake of brevity. As shown in FIG. 14B, one-byte errors shown by marks Δ and □ in FIG. 14B become two-byte-errors respectively at the error correction decoder 29 similarly to FIG. 14A.

Figure 14C:
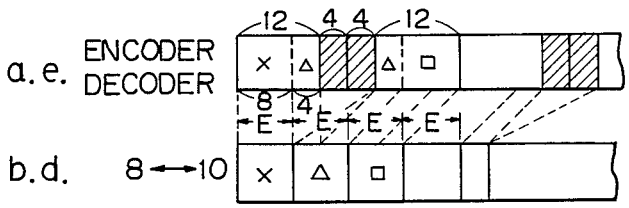

FIG. 14C shows the case of inserting two dummy data, each having four bits, to the upper bit side and the lower bit side of the adjacent two words respectively. In this case, a one-byte-error shown by mark Δ in FIG. 14C becomes only a two-byte-error at the error correction decoder 29. As a result, the scheme shown in FIG. 14C can prevent degrading of the error correction ability as compared with the arrangements shown in FIGS. 14A and 14B.

Further, FIG. 14D shows the case of inserting dummy data having eight bits. In this case, one-byte-errors shown by marks X, Δ and □ in FIG. 14D do not cause two-byte-errors, thereby eliminating the bad influence on error correction.

It is to be noted that one generating circuit for the header signal can be employed for both modes so that the header-signal-generation period is varied depending on the block period in the A mode and the B mode by controlling the generating circuit with a mode switching signal.

Next a reproduction system will be described. FIG. 8 shows an example of a reproduction system, and MS6~MS9 are mode switching circuits, each of which is switched on the side of a terminal A at the time of an A mode and on the side of a terminal B at the time of a B mode by a mode switching signal MDP which will be mentioned later.

PCM audio data separated from a signal reproduced by a rotational head is supplied to a block synchronization signal detector 23 through an input terminal 22. The PCM audio data supplied through the input terminal 22 is supplied to a PLL circuit 24, and, as a result, a clock signal in synchronism with a reproduced signal is provided. The clock signal is supplied to the detector 23 and the block synchronization signal is detected. The detected block synchronization signal is fed to a switching signal generator 25, and it is detected due to a difference of detected periods whether the reproduced signal assumes the A mode or the B mode to provide the mode switching signal MDP. The A mode is selected by the mode switching signal MDP.

An explanation will first be supplied of the case where the A mode is selected by the mode switching signal MDP. Specifically, data with a block synchronization signal detected is subjected to parallel conversion at a serial-parallel converter 26 and supplied to a 10–8 demodulator 27 where the 10-bit data is converted into 8-bit symbol data. The symbol data is supplied to an error correction decoder 29 through switch circuits MS6 and MS7 and subjected to error correction processing using an error detection or correction code C2 and an error correction code C1. The error-corrected data is supplied to a symbol/word converter 30 and converted into 16-bit-parallel word data.

This 16-bit-parallel word data is fed to a switch circuit SW2 through switch circuits MS8 and MS9. The switch circuit SW2 serves to switch a digital output and an analog output, and when it is switched on the side of a terminal DT, a digital audio signal is obtained at an output terminal 34D. Also, when the circuit SW2 is switched on the side of a terminal AD, it is converted to an analog signal by a 16-bit D/A converter 33, and an analog audio signal is produced at an output terminal 34A.

Next a description will be supplied of the case where the B mode is selected by the mode switching signal. In this case, 8-bit data from the 10–8 demodulator 27 is supplied to an dummy bit insertion circuit 28 through the switch circuit MS6.

The error correction-processed data is converted into 16-bit parallel word data in a symbol/word converter 30 and supplied to an insertion bit eliminating circuit 31 through a switch circuit MS8. In the symbol/word converter 30, inserted bits of four bits (dummy data) are eliminated for every word, and converted into 12-bit word data. This data is supplied to a 12–16 expander 32 and subjected to expansion, corresponding to the compression on the recording side, to be converted into 12-bit word data. The output of the expander 32 is supplied to the switch circuit SW2 through a switch circuit MS9, and a digital audio signal is produced at the output terminal 34D and an analog audio signal is produced at the output terminal 34A depending on the switching of the switch circuit SW2, respectively. As mentioned above, the mode switching signal MDP is provided by decoding an identification signal of the A mode and the B mode in the header signal.

The present invention has application in other situations. For example, a technique in which an 8-mm VTR can be used as a recording and reproducing device only for a PCM audio signal has been proposed by the use of the recording area AV of a color video signal for recording the PCM audio signal (refer to the aforementioned U.S. Pat. No. 4,542,419).

Figure 3:
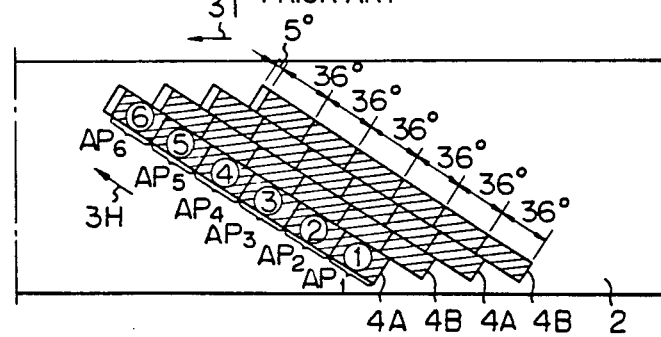
Figure 4:
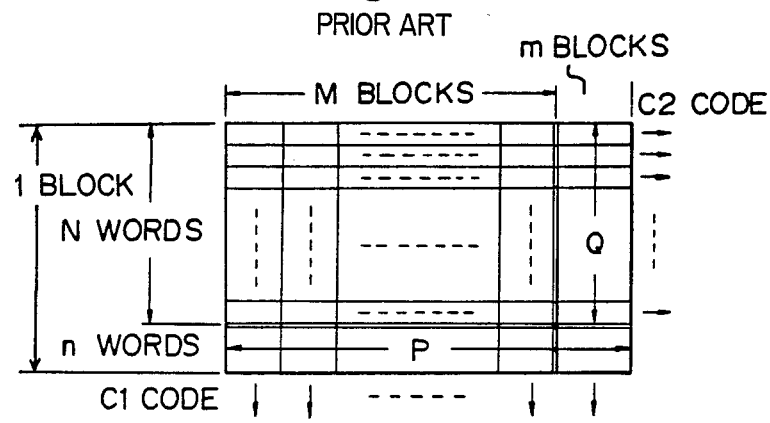
FIG. 4 and FIG. 5 are schematic diagrams for explaining one example of a conventional data transmission or reception apparatus.
Figure 5:
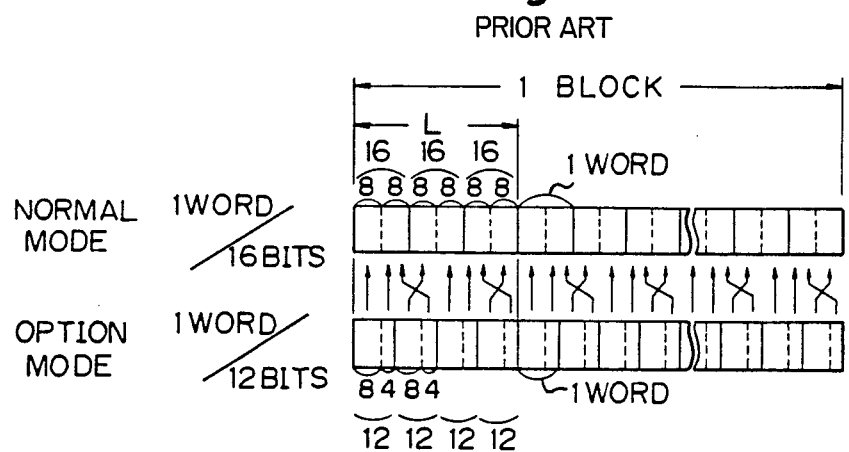
Figure 6A:
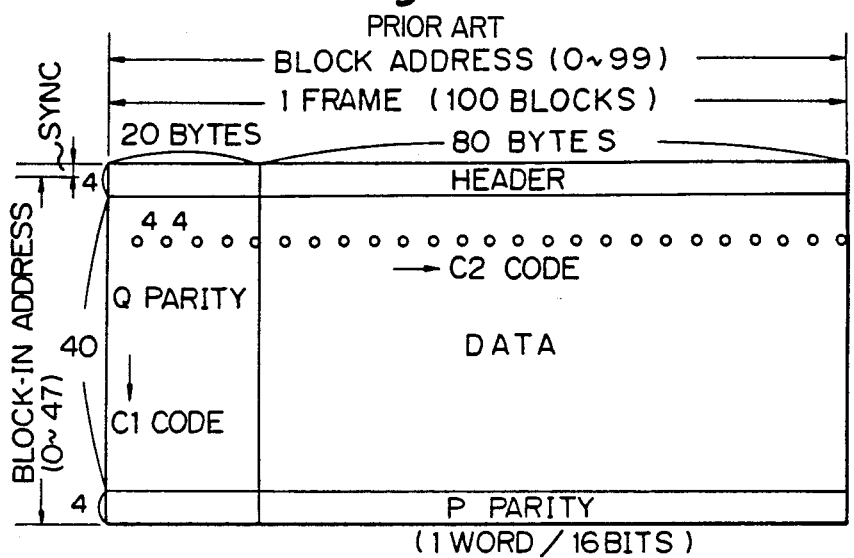
FIG. 6A and FIG. 6B are schematic diagrams of one example of an error correction code for use in the prior-art.
Figure 6B:
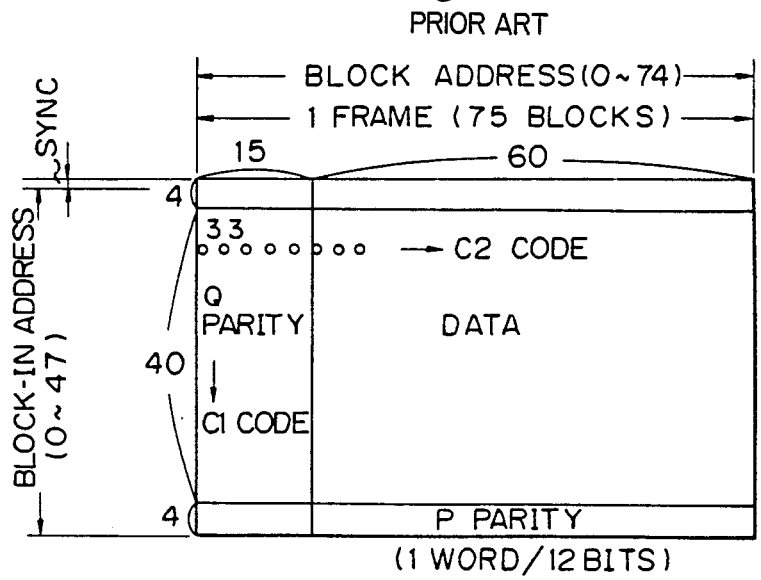

Namely, since the area AV of a 180°-angle range in which a video signal, etc. are recorded has a fivefold length as compared to the PCM area AP of a 36°-angle range, the area AV is divided into five equal parts, and as shown in FIG. 3, besides a track area AP1 of the original PCM audio signal shown at 1 per track 4A, 4B, five-divided tracks AP2 to AP6 are provided as indicated at 2 to 6. A PCM audio signal of one channel, that is, the audio signal of one field period is recorded and reproduced on each of the six-divided areas AP1 to AP6 in the form of a PCM and time compression signal.

Therefore, one channel of an audio signal can be recorded and reproduced at one area unit to permit the recording and reproduction of 6 channels. As a result, a six fold recording time (capacity) as compared to a conventional one is provided. This invention is adaptable to the recording and reproduction of the audio signal of each area unit in this case.

According to this invention, since the error correction encoding process and decoding process of a smaller n-bit word can be done as an m-bit word by adding m-n inserted bits to each word when the bit numbers per word are different in m and n (m>n), the error correction encoder and decoder can be completely used in common in the cases of m bits and n bits. Accordingly, the required hardware can be decreased even if there are two kinds of bit numbers.

It is to be noted that although the 12-bit data is divided into 8 bits and 4 bits and the inserted four bits are inserted in the foregoing example, 12-bit data can be divided into 6 bits and 6 bits and 2-bit inserted bits can be added to each 6-bit symbol.

Although the case of employing 16-bit-mode and 12-bit-mode corresponding to the ME tape and the MP tape has been shown and described with respect to the embodiment, it is possible to use 12-bit-mode for ME tape as needed. In addition, switching of 16-bit-mode and 12-bit-mode can be performed in accordance with the tape speed.

Also, the bit number of one word is not limited to those of the above-mentioned example.

Further, all 1's or a particular bit pattern can be inserted as the inserted bits instead of inserting all 0's.

In the above-mentioned embodiment, bit numbers m and n are selected per each two symbol word unit (one symbol is 8-bits). However, in this invention, it is possible to change the size of the unit. For example, this unit can be constituted by one symbol or two words L/R combined L of left audio channel and R of right audio channel.

Also, the above example is an example in which this invention is applied to the case of the recording and reproduction of an 8-mm VTR PCM audio signal but it goes without saying that the invention is not limited to that case. Needless to say, digital data is not limited to audio data.

Having described a specific preferred embodiment of the present invention with reference to the accompanying drawings, it is to be understood that the invention is not limited to that precise embodiment, and that various changes and modifications can be effected therein by one skilled in the art without departing from the scope or the spirit of the invention as defined in the appended claims.

What is claimed is:

1. A data transmission apparatus capable of selecting a first mode in which one unit of data is made up of m bits and a second mode in which one unit of data is composed of n bits (m>n), where m and n are integral numbers, with the same sampling frequency, comprising:
    (a) error correction encoding means commonly used for the first and second modes;
    (b) first insertion means for inserting m-n bits of dummy data into the units of data;
    (c) first elimination means for eliminating the inserted bits from the data; and
    (d) addition means for adding an information header, including at least a block synchronization signal to define blocks of data units, to the data,
    wherein in the first mode, data units composed of m bits each are encoded by the error correction encoding means to produce first mode, encoding-processed data, the addition means adds a first block synchronization signal to each block of the first mode encoding-processed data and outputs it, and data output from the addition means is transmitted, and
    in the second mode, the first insertion means inserts bits in each data unit composed of n bits so as to transform it into one unit of m-bit data which is supplied to the error correction encoding means where it is encoded and output as second mode encoding-processed data, the first elimination means eliminates the inserted bits from the output second mode encoding-processed data so as to output units of n bit data, these units of n bit data from the first elimination means are supplied to the addition means which adds a second block synchronization signal to each block of n-bit data and transmits it.

2. A data transmission apparatus according to claim 1, wherein the first insertion means further comprises means for compressing m bits of data to n bits of data.

3. A data transmission apparatus according to claim 1, wherein the error correction encoding means further comprises a word/symbol data converter for dividing the unit data into upper symbol bit data and lower symbol bit data.

4. A data transmission apparatus according to claim 3, wherein the addition means further comprises a bit number conversion circuit for modifying the bit pattern of the symbol bit data and reducing the direct current (DC) component thereof.

5. A data transmission apparatus according to claim 4, wherein the first insertion means adds the dummy data as the upper bits of the unit data.

6. A data transmission apparatus according to claim 4, wherein the first insertion means adds the dummy data as the upper bits and the lower bits to each data unit.

7. A data transmission apparatus according to claim 1, wherein the addition means for adding an information header also adds to the data a mode identification signal indicating whether the first mode is selected or the second mode is selected.

8. Apparatus for receiving transmission data transmitted from the data transmission apparatus according to claim 1, the apparatus, comprising:
   (a) synchronization detection means for detecting the first and second block synchronization signals from the transmission data;
   (b) switching signal generating means connected to the synchronization detection means for deciding whether the detected block synchronization signal is the first block synchronization signal or the second block synchronization signal and generating a corresponding mode switching signal;
   (c) second insertion means for inserting into the data units m-n bits of dummy data;
   (d) error correction decoding means used commonly for the first and the second mode; and
   (e) second elimination means for eliminating the inserted bits from the data;
   wherein when the first mode is selected by the mode switching signal, the error correction decoding means error correction decodes the data from the synchronization detection means and the m-bit data unit data is decoded, and
   when the second mode is selected by the mode switching signal, the data from the synchronization detection means is supplied to the second insertion means where the inserted bits are inserted into each unit of the n-bit data to make units of m-bit data, this data is supplied to the error correction decoding means and is decoding-processed, the decoding-processed data is fed to the second elimination means where the inserted bits are eliminated so as to decode the n-bit data units.

9. Apparatus for receiving transmission data with an identification code for identifying the first mode and the second mode according to claim 8, wherein the switching signal generating means decodes the identification signal to form a mode switching signal.

10. Apparatus for receiving data selectively transmitted in a first mode in which one unit is made up of m-bits or in second mode in which one unit is composed of n-bits (m>n), where m and n are integral numbers, with the same sampling frequency, comprising:
   (a) switching signal generating means for deciding whether the received data is in the first mode or the second mode and generating a corresponding mode switching signal;
   (b) insertion means for selectively inserting m-n bits of dummy data into each n-bit data unit;
   (c) error correction decoding means used commonly for the first and second modes; and
   (d) elimination means for eliminating the inserted bits from the data;
   wherein when the mode switching signal corresponds to the first mode, the error correction decoding means performs error correction decoding of the received data ad the m-bit data units are decoded,
   when the mode switching signal corresponds to the second mode, the received data is supplied to the insertion means so that the inserted bits are inserted into each n-bit data unit to make m-bit data units, this data is supplied to the error correction decoding means where the data is decoding-processed, and the decoding-processed data is fed to the elimination means and the inserted bits are eliminated so as to decode the n-bit data units.

11. Apparatus for receiving data according to claim 10, wherein the switching signal generating means comprises means for detecting a block synchronization signal from the received data.

12. Apparatus for recording a PCM audio signal on a magnetic medium by magnetic heads, capable of selecting a first mode in which one data unit is made up of m-bits and a second mode in which one data unit is composed of n-bits (m>n), where m and n are integral numbers, with the same sampling frequency, comprising:
   (a) error correction encoding means commonly used for the first and second modes;
   (b) insertion means for inserting m-n bits of dummy data into the data units;
   (c) elimination means for eliminating the inserted bits from the data; and
   (d) addition means for adding to the data an information header including at least a block synchronization signal to define blocks of data units,
   wherein in the first mode, data units composed of m-bits each are subjected to an encoding process at the error correction encoding means to produce first mode, encoding-processed data, a block synchronization signal for the m-bit data is added to define each block of the first mode, encoding-processed data at the addition means, and data output from the addition means is transmitted, and
   wherein in the second mode, the inserted bits are inserted into each n-bit data unit at the insertion means so as to make an m-bit data unit, the m-bit data units are encoded by the error correction encoding means to produce second mode, encoding-processed data, the inserted bits are eliminated from the second mode, encoding-processed data at the elimination means to produce n-bit data units which are supplied to the addition means where a block synchronization signal for n-bit data is added to each block of n-bit data and each such block is thereafter transmitted to the magnetic heads and magnetically recorded.

13. Apparatus according to claim 12, further comprising means for compressing m-bit data to n-bit data in the insertion means.

14. Apparatus according to claim 12, further comprising a word/symbol data converter for dividing data units into upper symbol bit data and lower symbol bit data in the error correction encoding means.

15. Apparatus according to claim 14, further comprising a bit number conversion circuit for modifying the bit pattern of the symbol bit data and reducing the direct current component thereof in the addition means.

16. Apparatus according to claim 15, wherein the insertion means adds the dummy data as the upper bits of the data unit.

17. Apparatus according to claim 15, wherein the insertion means adds the dummy data as the upper bits and the lower bits to each data unit.

18. Apparatus according to claim 12, wherein the addition means for adding an information header adds to the data a mode identification signal indicating whether the first mode is selected or the second mode is selected.

19. Apparatus according to claim 12, wherein the first mode is selected when a magnetic tape medium of metal evaporating type is used for transmitting the data and the second mode is selected when a magnetic tape medium of metal powder type is used for transmitting the data.

20. A data transmission method for selecting a first mode in which one unit of data is made up of m-bits and a second mode in which one unit of data is composed of n-bits (m > n), where m and n are integral numbers, with the same sampling frequency, comprising the steps of:
  adding an information header, including at least a block synchronization signal to define blocks of data units, to the data,
  in the first mode, error correction encoding data units composed of m-bits each to produce first mode error-corrected data, adding a first block synchronization signal to each block of the first mode error-corrected data and transmitting it; and
  in the second mode, inserting m-n bits of dummy data into each n-bit data unit so as to make it an m-bit data unit, error correction encoding the m-bit data units to produce second mode error corrected data, eliminating the inserted bits from the second mode error corrected data so as to output n-bit data units, adding a second block synchronization signal to each block of n-bit data units and transmitting it.

21. A data transmission method according to claim 20, wherein the step of inserting dummy data of m-n bits further comprises the step of compressing m-bits of data to n-bits of data.

22. A data transmission method according to claim 20, wherein the error correction encoding step further comprises the step of dividing the unit data into upper symbol bit data and lower symbol bit data.

23. A data transmission method according to claim 22, wherein the synchronization signal addition step further comprises the step of modifying the bit pattern of the symbol bit data and reducing the direct current (DC) component thereof.

24. A data transmission method according to claim 23, wherein the insertion step of inserting dummy data of m-n bits adds the dummy data as the upper bits of the data unit.

25. A data transmission method according to claim 23, wherein the insertion step of inserting dummy data of m-n bits adds the dummy data as the upper bits and the lower bits to each data unit.

26. A data transmission method according to claim 20, wherein the addition step of adding an information header also adds to the data a mode identification signal indicating whether the first mode is selected or the second mode is selected.

27. A method for receiving transmitted data generated by the data transmission method according to claim 20, comprising the steps of:
  (a) detecting the first or the second block synchronization signal from the transmission data;
  (b) deciding whether the detected block synchronization signal is the first block synchronization signal or the second block synchronization signal and generating a mode switching signal;
  (c) when the first mode is selected according to the mode switching signal, error correction decoding the data to produce m-bit data units;
  (d) when the second mode is selected by the mode switching signal,
    (i) inserting m-n bits of dummy data into each n-bit data unit to make an m-bit data unit,
    (ii) decoding-processing the m-bit data units, and
    (iii) eliminating the inserted bits from the m-bit data units so as to decode the n-bit data units.

28. A method for receiving transmission data with an identification code for identifying the first mode and the second mode according to claim 27, wherein the mode switching signal generating step includes the step of decoding the identification signal to form the mode switching signal.

29. A method for receiving data selectively transmitted in a first mode in which one unit is made up of m-bits or in second mode in which one unit is composed of n-bits (m > n), where m and n are integral numbers, with the same sampling frequency, comprising the steps of:
  (a) deciding whether the received data is in the first mode or the second mode and generating a corresponding mode switching signal;
  (b) when the mode switching signal corresponds to the first mode, error correction decoding the received data to generate decoded m-bit data units;
  (c) when the mode switching signal corresponds to the second mode,
    (i) inserting m-n bits of dummy data into each n-bit data unit to make an m-bit data unit,
    (ii) error-correcting the m-bit data units, and
    (iii) eliminating the inserted bits from the decoding-processed data so as to decode the n-bit data units.

30. A method for receiving data according to claim 29, wherein the switching signal generating step comprises the steps of detecting a block synchronization signal from the received data.

31. A method for recording a PCM audio signal on a magnetic medium by magnetic heads, capable of selecting a first mode in which one data unit is made up of m-bits and a second mode in which one data unit is composed of n-bits (m > n), where m and n are integral numbers, with the same sampling frequency, comprising the steps of:
  in the first mode, error correction encoding data units composed of m-bits each, adding a first block synchronization signal to each block of the error correction encoded data and transmitting it; and
  in the second mode, inserting m-n bits of dummy data into each n-bit data unit so as to make and m-bit data unit, error correction encoding the thus produced m-bit data units to produce encoding-processed data, eliminating the m-n bits from the encoding-processed data to produce n-bit data units, adding an information header including at least a second block synchronization signal to each block of n-bit data units and transmitting it to the magnetic heads and magnetically recording it.

32. Apparatus according to claim 31, further comprising the steps of compressing m-bits of data to n-bits data in the step of inserting dummy data of m-n bits.

33. Apparatus according to claim 31, further comprising the steps of dividing the data unit into upper symbol bit data and lower symbol bit data in the error correction encoding step.

34. Apparatus according to claim 33, further comprising the step of modifying the bit pattern of the symbol bit data and reducing the direct current component thereof in the adding step.

35. Apparatus according to claim 34, wherein the step of inserting dummy data of m-n bits adds the dummy data as the upper bits of the data unit.

36. Apparatus according to claim 34, wherein the step of inserting dummy data of m-n bits adds the dummy data as the upper bits and the lower bits to each data unit.

37. Apparatus according to claim 31, wherein the step of adding an information header adds to the data a mode identification signal indicating whether the first mode is selected or the second mode is selected.

38. Apparatus according to claim 31, wherein the first mode is selected when a magnetic tape medium of metal evaporating type is used as the medium of data transmission and the second mode is selected when a magnetic tape medium of metal powder type is used as the medium of data transmission.

* * * * *